United States Patent
Jäger et al.

(10) Patent No.: US 6,647,333 B2
(45) Date of Patent: Nov. 11, 2003

(54) METHOD OF REGULATING THE POSITION OF A CLUTCH ACTUATOR

(75) Inventors: Thomas Jäger, Meckenbeuren (DE); Reinhard Berger, Bühl (DE); Martin Zimmermann, Sasbach (DE); Georg Schneider, Karlsruhe (DE); Mario Jung, Sinzheim (DE); Jürgen Gerhart, Appenweier (DE); Alexander Renfer, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/017,484

(22) Filed: Dec. 14, 2001

(65) Prior Publication Data

US 2002/0128763 A1 Sep. 12, 2002

(30) Foreign Application Priority Data

Dec. 14, 2000 (DE) .......................... 100 62 456

(51) Int. Cl.⁷ .............................................. F16D 48/06
(52) U.S. Cl. .............................. 701/51; 701/67; 701/68; 477/166; 477/180; 192/3.51; 192/3.61
(58) Field of Search ........................... 701/51, 67, 68; 477/70, 86, 87, 89, 166, 179, 180; 192/3.51, 3.61

(56) References Cited

U.S. PATENT DOCUMENTS

| | | | | |
|---|---|---|---|---|
| 4,081,065 A | * | 3/1978 | Smyth et al. | 477/176 |
| 4,518,064 A | * | 5/1985 | Windsor | 192/3.58 |
| 4,561,530 A | * | 12/1985 | Parsons et al. | 477/176 |
| 5,176,234 A | * | 1/1993 | Reik et al. | 192/53.2 |
| 5,499,954 A | * | 3/1996 | Wagner et al. | 477/174 |
| 5,681,242 A | * | 10/1997 | Bates | 477/180 |
| 5,934,432 A | * | 8/1999 | Bates | 192/85 C |
| 5,980,428 A | * | 11/1999 | Liu | 477/180 |
| 6,202,015 B1 | * | 3/2001 | Iizuka | 701/51 |

FOREIGN PATENT DOCUMENTS

| | | | | |
|---|---|---|---|---|
| EP | 38113 A2 | * | 10/1981 | B60K/41/02 |
| JP | 07158667 A | * | 6/1995 | F16D/48/06 |

* cited by examiner

Primary Examiner—Michael J. Zanelli
Assistant Examiner—Eric M Gibson
(74) Attorney, Agent, or Firm—Darby & Darby

(57) ABSTRACT

A method of regulating the position of a clutch actuator in a vehicle employs the concept of adapting the servo-loop parameters of a position controller of the clutch to different operating conditions of the vehicle, as well as the concept of applying and continuously adapting a bias current of the actuator motor in order to avoid or minimize the incidence of a hunting or after-regulation behavior of the control loop and to thereby minimize the energy consumption of the actuator motor.

31 Claims, 4 Drawing Sheets

METHOD OF REGULATING THE POSITION OF A CLUTCH ACTUATOR

BACKGROUND OF THE INVENTION

The present invention relates to a method of regulating the position of a clutch actuator, specifically in a motor vehicle equipped with an automated shift transmission and an electronic clutch management system.

The term "shift transmission" in the present context is used primarily for a transmission with different gear ratios that are shifted manually by the driver of the vehicle by means of a shift lever. Shift transmissions of a variety of configurations are known in the prior art. A common trait of shift transmissions is that the gear shift process has two phases: a) moving the shift lever in a selector track to one of a plurality of shift tracks of the transmission, and b) moving the shift lever within the selected shift track to engage the intended gear ratio.

In addition to the manual shift transmissions just described, the state of the art also includes automated shift transmissions, in which the phases of selecting the shift plane and engaging the intended gear ratio are performed by actuators that are coupled by means of a force transfer mechanism to internal shifter elements of the transmission such as a central shift-control shaft and shift-control rods.

The known automated shift transmissions of the foregoing description are used in combination with an electronic clutch management system which automatically engages and disengages the clutch, so that all the driver has to do is select the intended gear. The clutch is operated by the electronic clutch management system.

In the course of recent technical efforts to optimize the shift process in an automated shift transmission, the requirements have substantially increased for the clutch actuator to move into and hold a given actuator position precisely. However, with the requirement for increased precision in a position-seeking control loop in an actuator driven by an electric motor, the latter has to work for longer time intervals, which increases electric power consumption. When regulating the clutch to a given target position, the electric motor performs only very small movements, so that a disproportionate amount of the power supplied to the electric motor is converted into heat.

A position-seeking controller turns off when the targeted actuator position has been set within a given hysteresis bandwidth where the deviation from the control target is less than a given regulation threshold in the order of 0.1 to 0.2 mm. A steady bias current to the actuator is active only at times when the position controller is turned off.

A so-called hunting or after-regulation behavior of the position control loop occurs if the actuator does not have an adequate amount of holding force or holding torque, so that the counteracting force can push the actuator outside the aforementioned hysteresis bandwidth of the regulated position. This can occur only at a time when the position controller is turned off. As the hysteresis bandwidth is exceeded, the position controller is reactivated to regulate the actuator back to the target position. The back-and-forth movement where the actuator is pushed out of and then regulated back into the target position is referred to herein as after-regulation or hunting.

OBJECT OF THE INVENTION

The present invention therefore has the objective of providing a method of regulating the position of a clutch actuator, specifically in a motor vehicle equipped with an automated shift transmission and an electronic clutch management system, so that the power consumption of the clutch actuator is minimized while the full functionality of the electronic clutch management system is maintained.

SUMMARY OF THE INVENTION

To meet the foregoing objective, the invention proposes a method of regulating the position of a clutch actuator in a vehicle that is equipped with a clutch control device, for example of the kind known as electronic clutch management system. The method can be described in three steps, as follows:
 a) The clutch control device determines the current operating state of the vehicle based on a plurality of operating parameters of the vehicle.
 b) The clutch control device selects a set of regulation parameters out of a plurality of available regulation parameter sets.
 c) The clutch control device regulates the position of the clutch actuator through a position-control loop, using the selected set of regulation parameters.

This method has the advantage that the regulation parameters are adapted to different operating states of the vehicle, so that the regulation process depends on the situation. The adaptation of the parameters is such that the regulation process is made more efficient, resulting in reduced energy consumption.

In road tests of the method, it was found that the regulation could be performed at a reduced level of precision more than 50% of the time without a loss in driving comfort.

In a preferred embodiment of the invention, at least two predetermined sets of regulation parameters are available, from which the clutch control device selects a specific parameter set dependent on the operating state of the vehicle. With the different parameter sets, the regulation can be better adapted to different situations.

Instead of transmitting the entire set of regulation parameters, a binary flag is used to transmit the operating status from the clutch control device to the position-regulating control loop and to thereby communicate which of the regulation parameter sets is to be selected. If there are more than two sets of parameters, an appropriate number of flags has to be used for the data transmission. The object is to minimize the volume of data communication between the clutch control device and the position-regulating control loop.

A set of regulation parameters preferably includes the servo loop constants known, respectively, as the P-, I- and D-coefficient for the proportional, integrating, and differentiating term of the control function, a precision criterion, as well as the limits of the hysteresis band, i.e., the points where the position controller is switched off and back on.

The precision requirement can be divided into a fine and coarse precision criterion, to work with two precision ranges in the most elementary application of the inventive concept. It is also possible to use a higher number of ranges.

If two ranges are used, the switch-off threshold under the fine-precision criterion is preferably around 0.02 mm from the target position and the threshold for switching the controller back on is preferably around 0.1 mm from the target position. Under the coarse-precision criterion, the preferred switch-off threshold is around 0.1 mm from the target position and the preferred threshold for switching the controller back on is around 0.2 mm from the target position.

The clutch actuator has an electric motor, whose speed and direction are controlled in order to actuate the clutch. An electric motor has numerous advantages over a hydraulic system. Importantly, the problems of leakage and of aggressive hydraulic fluids are avoided with an electric motor.

In a preferred embodiment, a position sensor is integrated in the clutch actuator to determine the current actuator-travel position in absolute terms.

After the actuator has been set and regulated to a prescribed target position and the position controller has been switched off, it is possible that the position-holding force or holding torque of the clutch actuator is not strong enough to keep a lever of the clutch mechanism in a set position, particularly if the clutch requires a strong clutch-release force. Thus, the lever is pushed back by the force of the clutch, so that a position control loop has to regulate the actuator back to the target position. This increases the load on the clutch actuator, and the after-regulation can also manifest itself through a chattering of the clutch.

To prevent after-regulation, it is necessary to oppose the clutch force with a counteracting force. This counteracting force is generated by applying a steady bias current to the clutch actuator during the time phases when the position controller is switched off. Given that the clutch-release force of the clutches varies from one vehicle to the next within a very wide tolerance range, the level of the bias current has to be selected individually in each vehicle.

In a further embodiment of the method according to the present invention, the regulation of a clutch actuator to a a targeted position can be described by the following steps:
 a) The clutch control device determines the actual position of the clutch actuator.
 b) The clutch control device compares the actual position to a target position of the clutch actuator.
 c) The clutch control device determines the extent and the direction of an after-regulation occurring in the clutch actuator.
 d) The clutch control device updates the level of the bias current to the clutch actuator in accordance with the extent and direction of the after-regulation detected under step c).

This has the advantage that the optimized level of the bias current in the clutch actuator reduces the overall amount of energy used during after-regulation periods of the clutch actuator. By adjusting the level of the bias current, the need for an after-regulation is in many cases avoided.

The bias current to the clutch actuator is turned on only during time periods when the position-regulating loop is switched off.

According to a preferred embodiment of the invention, the amount of the bias current is dependent on the position of the clutch actuator. The bias current as a function of the clutch position follows a characteristic or profile that can be expressed as a percentage of the maximum possible actuator current.

Preferably, the profile of the bias current is stored as a default profile before a vehicle is put into service. The default profile indicates the amount of current to be applied to the clutch actuator at given points of its displacement range that are spaced at predetermined intervals.

It is advantageous and also adequate to use, for example, four reference points for the profile of the bias current. If the reactive force opposing the actuator is known qualitatively as a function of actuator displacement, one could use a higher density of reference points in a portion of the range where the reactive force is strong and a lower density where the reactive force is comparatively weak. If evenly spaced reference points are used, the distance between them could be about 0.5 mm.

Based on the amount of after-regulation, the respective values of the current profile are adjusted for all reference points.

The adjustment is preferably made in predetermined percentage increments of the voltage or current, or it can be based on the amount of after-regulation, or in can occur in variable steps.

However, the value of the bias current at each reference point is limited by a maximum permissible value and/or by a maximum permissible difference between the values at adjacent reference points.

There are numerous possibilities for determining the current profile during an operating phase of the vehicle, of which the following are preferred:
 a) A new calculation, starting from initial values of zero, is made at every start-up of the vehicle when the ignition is switched on.
 b) A new calculation, starting from a profile of default values, is made at every start-up.
 c) A new calculation, starting from a profile of most currently stored values, is made at every start-up.
 d) A new calculation is made as in case c), but the values at individual reference points are given different weights.
 e) A new calculation is made at every start-up, using any combination of the foregoing possibilities a) through d).

A further embodiment of the inventive method can be described by the following sequence of steps:
 a) The clutch control device determines actual position values of the clutch actuator.
 b) The clutch control device determines targeted position values of the clutch actuator.
 c) The clutch control device determines whether the current regulating process is an initial move or an after-regulation to the current target position, based on comparing actual and targeted position values.
 d) The clutch control device generates a bias current to the clutch actuator in accordance with the results of steps a) to c).

Dependent on the comparison in step c) of the foregoing method, the amount and the polarity of the bias current to the clutch actuator can be adapted and optimized so that, as a result, the method will save energy.

To perform the foregoing method, the clutch actuator preferably has an integrated position sensor to detect the actual position value $K_{actual}$.

The values $K_{target}$ for the target position determined in step b) of the method are assigned to one of three groups corresponding to three different conditions of the actuator. The groups are defined according to the trend in successively detected values, i.e., whether the values increase, decrease, or stay constant from one to the next. An increasing trend is taken as an indicator that the actuator is pushing the clutch farther than the targeted displacement position; a decreasing trend is taken as an indicator that the clutch actuator is receding from the targeted displacement position; and a constant value indicates an intermediate condition.

The values $K_{target}$ are assigned to the group of increasing values if they change monotonically in a positive direction.

More specifically, the values $K_{target}$ are assigned to the group of increasing values if preferably at least the three most recent values of $K_{target}$ show an increasing tendency and/or exceed a threshold value of increase from one to the next.

If the increase of three consecutive values of $K_{target}$ exceeds a predetermined threshold, the clutch control device determines that the clutch actuator is not in a state of after-regulation.

Analogously, the values $K_{target}$ are assigned to the group of decreasing values if they change monotonically in a negative direction.

More specifically, the values $K_{target}$ are assigned to the group of decreasing values if preferably at least the three most recent values of $K_{target}$ show a decreasing tendency and/or exceed a threshold value of decrease from one to the next.

If the decrease of three consecutive values of $K_{target}$ exceeds a predetermined threshold, the clutch control device determines that the clutch actuator is not in a state of after-regulation.

The values $K_{target}$ are assigned to the group of constant values if they do not change significantly from one to the next.

More specifically, the values $K_{target}$ are assigned to the group of constant values if they lie within a certain bandwidth which is defined preferably as the hysteresis width that serves as a criterion for switching off the position control loop.

The novel features that are considered as characteristic of the invention are set forth in particular in the appended claims. The inventive method itself, however, both as to its mode of operation and its application in a motor vehicle, together with additional features and advantages thereof, will be best understood upon perusal of the following detailed description of certain presently preferred specific embodiments with reference to the accompanying drawing.

BRIEF DESCRIPTION OF THE DRAWINGS

Embodiments of the invention are described below as examples only, and no limitations are thereby implied. The description refers to the attached drawings, wherein.

DETAILED DESCRIPTION OF THE INVENTION

Figure 1:
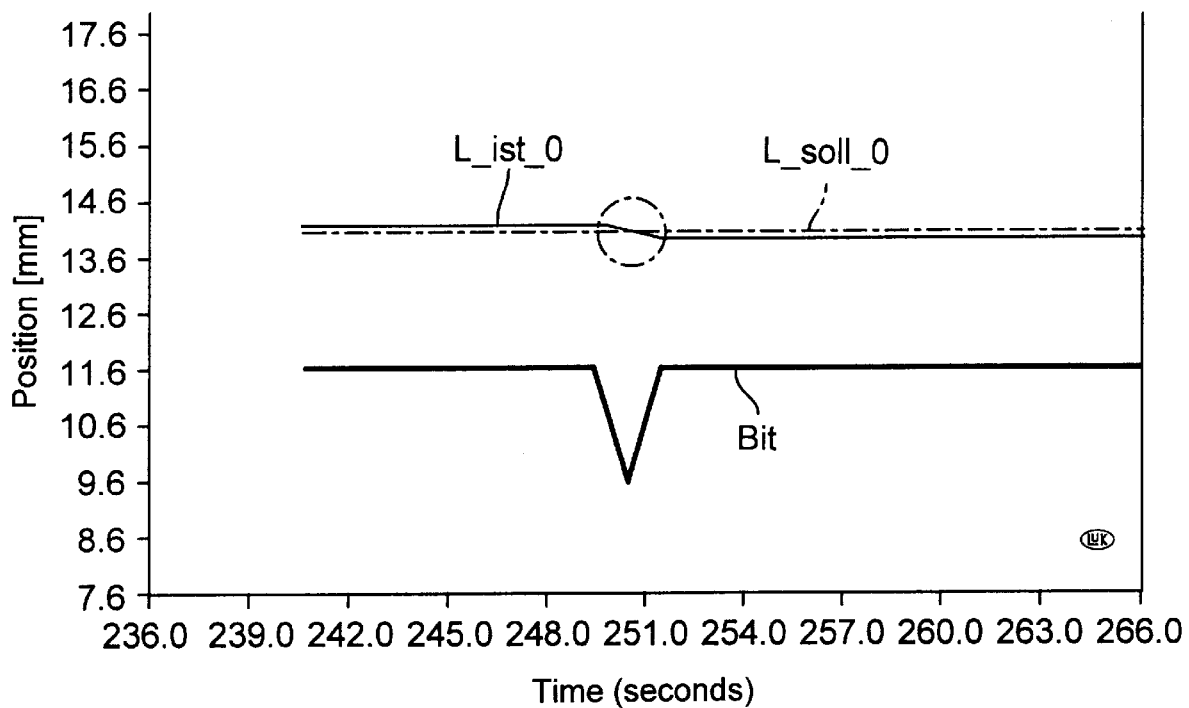
FIG. 1 represents a switch-over between parameter sets in a position control device for a clutch actuator, illustrated as a graph in which the actuator position in millimeters is shown as a function of the time.

To explain the invention, some examples of embodiments will be discussed in more detail.

In a first example, the method is adapted to the degree of precision required in setting the clutch torque and to the objective of minimizing the heat developed in the electric motor and its components.

Dependent on different operating states of the vehicle, different sets of control parameters are used for the regulation. A clutch control device selects the appropriate set of regulation parameters from two or more available parameter sets and causes a position control loop to use the selected parameter set in regulating the movement of the clutch actuator to a target position.

The parameter set preferably includes the servo loop constants, such as the coefficients of the proportional, integrating and differentiating terms of the control function, as well as the data concerning the required precision, i.e., the thresholds for switching the position-regulating controller off and for switching it back on.

It was demonstrated in serial experiments that alone by changing the respective thresholds for switching the position-regulating servo controller off and back on to adapt the thresholds to different precision requirements, a significant portion (20%) of the energy for the electric motor of the actuator could be saved. The respective numerical results for fine-precision limits (narrow threshold) and for coarse-precision limits (wide threshold) were as follows:

| Fine precision: | switch-off threshold | 0.02 mm |
| | reactivating threshold | 0.10 mm |
| Coarse precision: | switch-off threshold | 0.10 mm |
| | reactivating threshold | 0.20 mm |

In the most elementary embodiment of the invention, two parameter sets are provided, one for fine-precision regulation and the other for coarse-precision regulation, which are used in the following operating states of the vehicle:

| Fine precision: | Adaptation of the gripping point of the clutch to the coefficient of friction; driving with a slipping clutch on start-up or after shifting gears, crawl-speed travel of the vehicle; tentative, exploratory clutch engagement to find the zero point where engagement begins; putting the vehicle into service. |
| Coarse precision: | All other driving situations, including in particular: Driving with a minimum amount of torque; Adjusting the torque that the clutch will transmit without slipping; Disengaging the clutch to shift gears or to shift into neutral. |

It is possible to have the clutch control device exchange the entire parameter sets of the position-regulating controller. However, it is less complicated to use a binary flag to indicate which of two parameter sets is to be used, with the parameter sets residing in the position-regulating controller. It is also conceivable that individual selected parameters are transmitted to the position controller.

If more than two parameter sets are used, there has to be an appropriate number of binary bits in the flag signal to cover the number of parameter sets.

The diagram of FIG. 1 represents a regulation process with an actual position $P_{actual}$ and a target position $P_{target}$. In the lower part of the diagram the status of a binary flag is shown, which controls the switch-over point between the two parameter sets.

At the time of the change to the second parameter set (at about 250 sec), the threshold for turning the position control loop back on is exceeded, so that the actuator performs an after-regulation.

With the inventive method, specifically with the foregoing concept of regulating the actuator position, the energy consumption of the electric motor can be lowered significantly.

In a second embodiment of the invention, the level of the bias current supplied to the actuator is adjusted in a manner calculated to avoid an after-regulation activity of the clutch actuator. This measure, likewise, saves energy.

During operation of the vehicle, there can be situations where the holding force or holding torque in the actuator is not strong enough to hold a lever of the clutch mechanism immobilized at a desired position. This is particularly the case if the clutch has a high release force. As the reaction of the clutch pushes the lever back, a position-regulating servo has to return the lever to the target position, which also increases the workload of the clutch actuator. The position readjustment, also referred to herein as after-regulation or hunting, can further cause a chatter effect in the clutch.

To avoid the after-regulation, the aforementioned reaction of the clutch has to be opposed by a counteracting force. This counteracting force is generated by applying a bias current to the clutch actuator during the time phases when the position controller is switched off. Given that the clutch-release force of the clutches varies from one vehicle to the next within a very wide tolerance range, the profile of the bias current over the movement range of the clutch actuator has to be selected individually in each vehicle.

Figure 2:
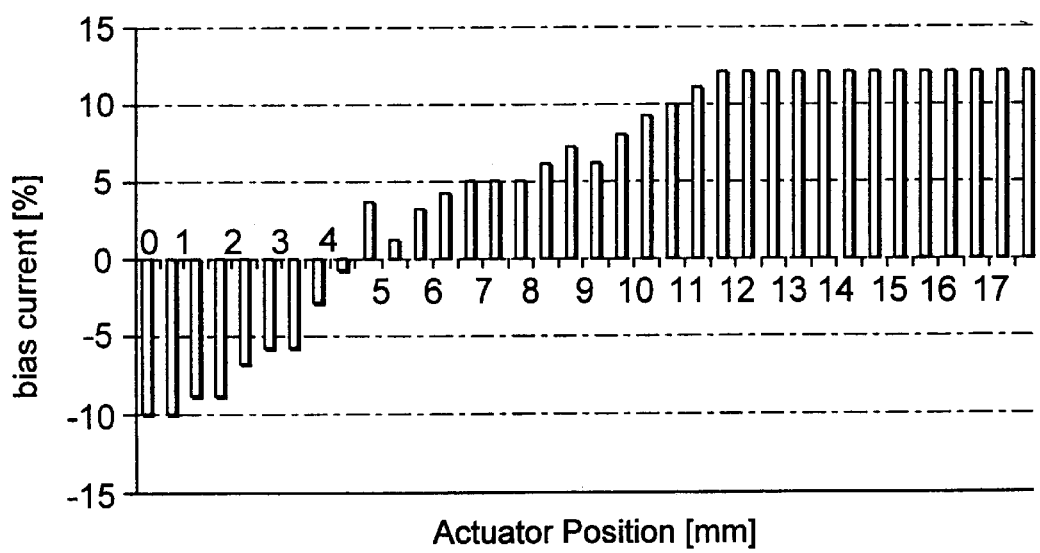
FIG. 2 represents a profile of the bias current (in %) to be applied to the clutch actuator as a function of the displacement position in millimeters.

FIG. 2 shows the bias current as a percentage of a maximum current in function of the clutch actuator position in millimeters. The positive current values cause a clutch actuation towards the disengaged position, while negative current values cause actuation towards the engaged position of the clutch.

The magnitude and polarity of the bias current is a function of the absolute clutch position.

As soon as the onset of after-regulation is detected, a bias current is applied to oppose the incipient movement of the clutch actuator. As mentioned above, the amount of current required is different from one vehicle to the next, and it is also a function of the absolute position of the clutch actuator.

In order to determine the appropriate profile of the bias current for each clutch and clutch actuator, the optimum profile as a function of the actuator position has to be determined in an operating state of the vehicle and stored in memory.

For the determination of the profile of the bias current, the displacement range of the clutch actuator is divided into segments of equal length. In the example of FIG. 2, a displacement range of 18 mm is divided into 36 segments of 0.5 mm each.

As soon as an after-regulation is detected in one of the segments, the level for the bias current in that segment is adjusted, so as to prevent after-regulation for that particular actuator position.

The position-regulating controller switches off when the regulation is within the hysteresis range (0.1 mm for switching the control off, and 0.2 mm for switching it back on). The bias current is used only during phases when the position-regulating control loop is switched off.

An after-regulation occurs only if the reactive force of the clutch against the actuator is large enough to overcome the holding force of the actuator, so that the actuator is pushed out of its target position. This condition is possible only when the position-regulating controller is switched off. As the actuator is pushed out of its target position, the hysteresis is exceeded in the direction of the pushing force, so that the controller is reactivated and seeks to return the actuator to the target position. The alternating action where the actuator is pushed out of its target position and then regulated back into the target position is herein referred to as after-regulation or hunting behavior.

The current profile can be established only if there is a way of detecting the after-regulation. Thus, if a current profile is used for the bias current, the first step is to detect the after-regulation.

For example, if an after-regulation is detected at an actuator displacement position of 4.5 mm ("A" in FIG. 2), the bias current for this position will have to be increased, corresponding to an increased force in the direction of disengagement of the clutch.

The adjustment of the current can be made in different ways.

For example, the adjustment could consist of a fixed increase or decrease of, e.g., 2% (in terms of the maximum value of the current).

As another possibility, the adjustment could consist of an increase or decrease whose size depends on the extent of the after-regulation, meaning that a strong after-regulation will lead to a large increase or decrease in the bias current, while a small after-regulation will cause only a slight increase or decrease of the bias current.

As yet a further possibility, the adjustment could consist of an increase or decrease whose size depends on the existing value for the bias current at a given position, using large increments of, e.g., 5% (in terms of a maximum current) if the existing value is around zero, smaller increments of, e.g., 2% if the existing value is 7% or more, and increments of 1% if the value is 11% or more.

Preferably, the absolute values for the bias current should be limited within a set maximum and minimum amount. The limit values can be of equal or different magnitude in the positive and negative direction.

As an alternative or in addition, it is also possible to limit the difference in the bias current between adjacent segments of the profile graph (FIG. 2).

The calculation, adjustment and memory storage of the profile can occur in several different phases which can be used alternatively or in a manner complementing each other.

For example, the profile can be calculated anew in each operating phase of the vehicle, setting the current values to zero every time the ignition is switched on.

Alternatively, instead of starting from zero, the new calculation of the profile can start from a default profile, in which a starting value other than zero is assigned to each segment of the profile.

The profile is preferably stored in an EEPROM. The stored value may also be multiplied with a weight factor of, e.g., 50%.

Any combination of the foregoing possibilities may be employed. For example, calculating the new profile from a default profile and storing the profile with a weight factor has proven to be particularly effective.

In other words, when the vehicle is first put into service, a default profile is used and modified during operation of the vehicle. When turning the ignition off, the modified profile is stored with a weight factor, so that the next operating phase can be started with the stored profile.

As a variation of the process of establishing the current profile, when an adjustment is made in one segment of the profile, the adjustment may also be applied at a reduced rate (e.g., 50%) to the neighboring segments, and possibly at a further declining rate to the once removed and further removed neighboring segments.

If the profile of the reactive force on the actuator as a function of the displacement position is known, the increments for changing the current profile can be made bigger in the profile segments where the reactive force is strong, and smaller in the profile segments where the reactive force is weak.

The foregoing concept has the purpose of avoiding an excessive increase of the current in portions of the actuator range where the reactive force is weak.

As a further possibility, adjustments to the current profile could be based on the frequency at which after-regulation occurs at different actuator positions. The frequency can be determined by counting the incidents of after-regulation over a time interval that remains either fixed over the life of the vehicle or changes (in particular, increases) over the life of the vehicle.

If after-regulation occurs too often during the time interval, the current is changed in larger increments. If the incidence of after-regulation is low, the current is changed in small increments only.

A third embodiment of the inventive method proposes the alternative or additional concept of making a determination whether a regulation process is a normal regulation process (i.e., an initial move to a targeted postion) or an after-regulation process.

After a given position has been attained by means of a position-regulating servo loop, the current to the electric motor is preferably turned off when the actual position is within a switch-off hysteresis range. The clutch actuator has a certain amount of static friction, which works as a holding force so that an actuator position can be maintained even when the electric motor is inactive. However, if the reactive force on the actuator becomes too large, it is possible that the actuator will be pushed out of its position. This reactivates the position-regulating loop to return the actuator back to the target position. The latter process is herein referred to as after-regulation or hunting behavior.

The push that moves the actuator back from its position is due to a reactive force from the clutch on the actuator that is large enough to overcome the holding force. It occurs when the position-regulating servo controller is switched off and/or if the controller is running and performing actual-vs-target comparisons with the actuating signal switched off inside the hysteresis band.

In a different situation, the actuator may also run ahead of its target position. The term "run ahead" refers to a condition where the reactive force against the actuator is too small. For example, actuator devices used in electronic clutch management systems or in automated shift transmissions have a compensation spring that assists the force of the electric motor. If the actuator works against a reactive force that is too small, the actuator may be pushed out of a rest position in the direction against the reactive force. This is particularly the case, if in addition to the spring force a bias current of, e.g., 7% of the maximum current is applied to the actuator motor. This type of dislodgement of the actuator is referred to as running ahead.

Because of the friction in the release mechanism, the resultant reactive force on the actuator is subject to a direction-dependent hysteresis, so that the reactive force is larger when the actuator is working in the direction of disengaging the clutch than in the direction towards engaging the clutch. As a result, the push-back condition occurs generally when disengaging the clutch and the run-ahead condition occurs when engaging the clutch.

The countermeasures to prevent after-regulation are different depending on whether the dislodgement of the clutch is of the push-back or run-ahead type.

The method for detecting and interpreting a state of after-regulation therefore begins with the step of classifying a detected trend in the position values of the actuator according to three categories, as follows:

1. Increasing values of $K_{target}$ indicate a push-back condition.
2. Decreasing values of $K_{target}$ indicate a run-ahead condition.
3. Constant values of $K_{target}$ are possible with either a push-back or a run-ahead condition.

Depending on which condition has been found in the foregoing step, the following step categorizes regulation processes into normal regulation processes and after-regulation processes. A regulation process is referred to as normal, if the position-regulating controller is switched on because a new target position has been set.

In regard to the foregoing case 1 (increasing values of $K_{target}$): A situation is assigned to this category if the values of $K_{target}$ exhibit a steady positive trend (i.e., a monotonic increase). The slope of the increase can be constant or it may vary. It is also possible, that $K_{target}$ changes during a short time interval and then stays constant over two or more detection cycles. All of the foregoing cases are assigned to the first category (values of $K_{target}$ increasing). The procedure for determining an increase is, e.g., to store the values of $K_{target}$ of the last five preceding detection cycles and to determine how many times there is an increase from one to the next following value. If there are more than three increases (or if there are more than three increases exceeding a given threshold value), the result of the trend analysis is that $K_{target}$ is increasing. It is also possible to measure an increase as a mean value for the five most recent detected values of $K_{target}$ and to assign the situation to the first category if the mean increase exceeds a given threshold value.

If the increase of $K_{target}$ exceeds a certain amount, the possibility of an after-regulation is ruled out, because the time lag of the controller and actuator will lead to a continuing discrepancy between the actual position and the target position, so that the regulating servo will not switch off and the actuator will be continuously active.

For this reason, one can further differentiate in case 1 that the possibility of an after-regulation is ruled out if the increase of $K_{target}$ exceeds a certain rate.

In regard to case 2 (decreasing values of $K_{target}$): The procedure is analogous to case 1, except that the directions and polarities are reversed.

In regard to case 3 (constant values of $K_{target}$). A situation is assigned to this category, if the values for $K_{target}$ exhibit absolutely no change. In a case where the values of $K_{target}$ change only to an insignificant degree so that the actual position values $K_{actual}$ remain within the switch-on hysteresis band even if the target position $K_{target}$ has changed, it is practical to classify $K_{target}$ likewise as constant.

The value of $K_{target}$ can be stored at a certain time, i.e., when the position-regulating controller switches off. If $K_{target}$ subsequently changes only within a predetermined range (e.g., within the switch-on hysteresis band) the case is assigned to the category 3 (constant values of $K_{target}$).

Figure 5:
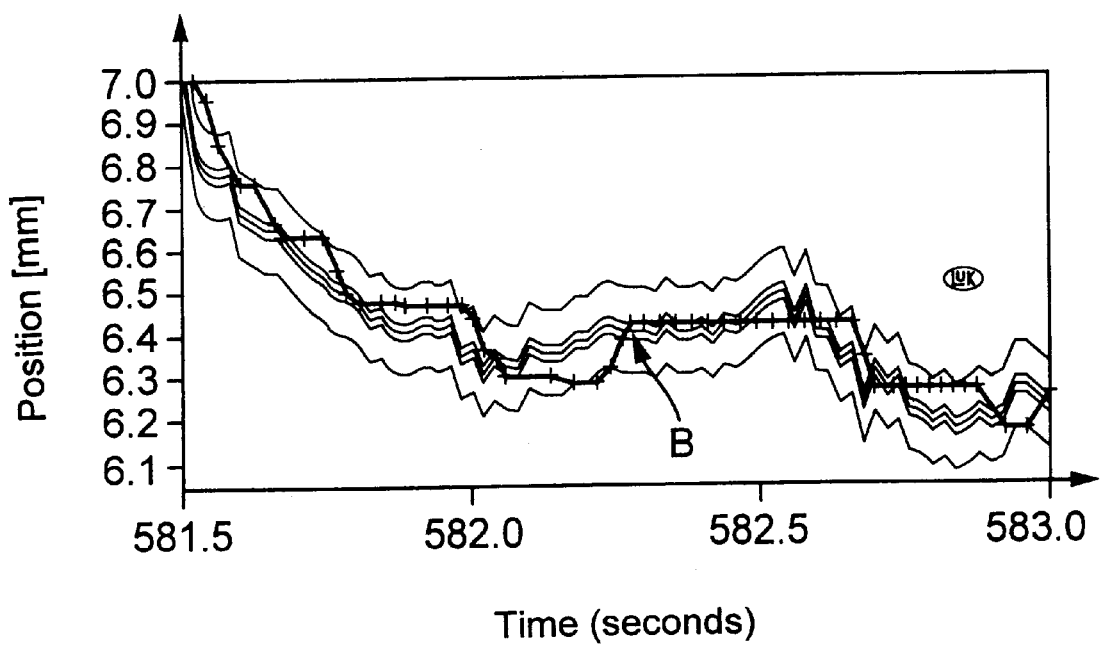
FIG. 5 represents a graph to illustrate the relationship between an actual position value $K_{actual}$ and a targeted position value $K_{target}$ of the position controller.

FIG. 5 illustrates this case.

The letter B and an arrow indicate the point in time where the position-regulating controller switches off, $K_{actual}$ remains constant and $K_{target}$ changes only to an insignificant degree, so that this case is assigned to the category 3 (constant values of $K_{target}$).

A change from one case to another can be recognized as follows: As soon as the conditions for a previously detected case (increasing, decreasing or constant) no longer exist, the monitoring for after-regulation can be switched off. This procedure is justified, because after-regulation is impossible in certain situations, e.g., when the values of $K_{target}$ change rapidly.

Alternatively, the monitoring for after-regulation can remain active, until the conditions for a new situation are met. In this case, the monitoring for after-regulation is operating continuously.

In addition to merely detecting the presence of an after-regulation, a differentiation can be made as to which of the foregoing three cases 1 to 3 is present. A determination of after-regulation can be tied to the following conditions:

After-regulation is found to be present if the difference $K_{target}-K_{actual}$ is above or below a given threshold value, while at the same time $K_{target}$ changes in only one of the three ways defined above. The threshold value is preferably defined with a hysteresis band, which can be the same as or different from the switch-on hysteresis of the position-regulating controller.

Figure 3:
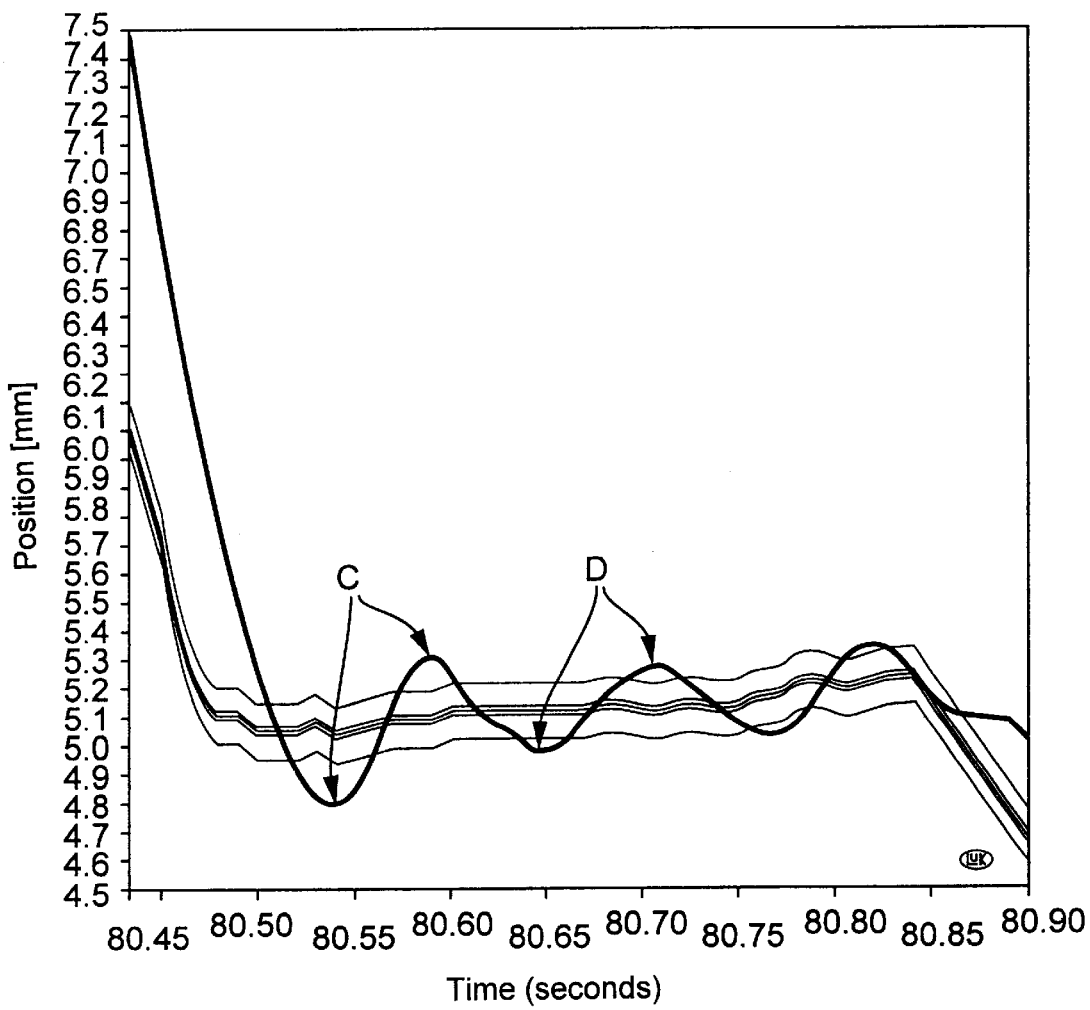
FIG. 3 represents a graph of actuator position vs. time to illustrate the operation of the position control device.

After-regulation is found to be present if the actuator in a certain situation (decreasing, increasing, or constant) is either pushed back or runs ahead of its rest position for a given minimum number of detection cycles. Preferably, the minimum number is three, because the position-regulating servo can overshoot once in each direction, as shown in FIG. 3. The overshoot oscillations at "C" are occurring in the initial move to the target position, while the overshoot oscillations at "D" show a push-back condition being corrected by after-regulation.

After-regulation is found to be present if the number of detection cycles in which $K_{actual}$ is found outside the switch-off hysteresis band is less than a given maximum number of cycles. In certain circumstances, it is possible that the position-regulating servo works with a permanent deviation of $K_{actual}$ from $K_{target}$, as can be the case with a purely proportional regulation loop. If the given maximum number of detection cycles is exceeded in which $K_{actual}$ is found outside the hysteresis limit, this can be taken as an exact criterion that the control loop is not in an after-regulation phase, but that a permanent deviation of $K_{actual}$ from $K_{target}$ is present.

After-regulation is found to be present only after the deviation ($K_{target}-K_{actual}$) has been found outside of a predetermined bandwidth for a given fixed number of detection cycles.

If in a given situation (decreasing, increasing, or constant) an after-regulation has been recognized, e.g., after a push-back of the actuator has occurred twice, and if further after-regulation phases are found in the same situation, it is preferred to ignore the further after-regulation phases until the situation changes. It is also a preferred concept to determine that the current situation is concluded and to start anew with the determination of the situation and detection of after-regulation, although the actual behavior of $K_{target}$ still conforms to the previous situation.

Figure 4:
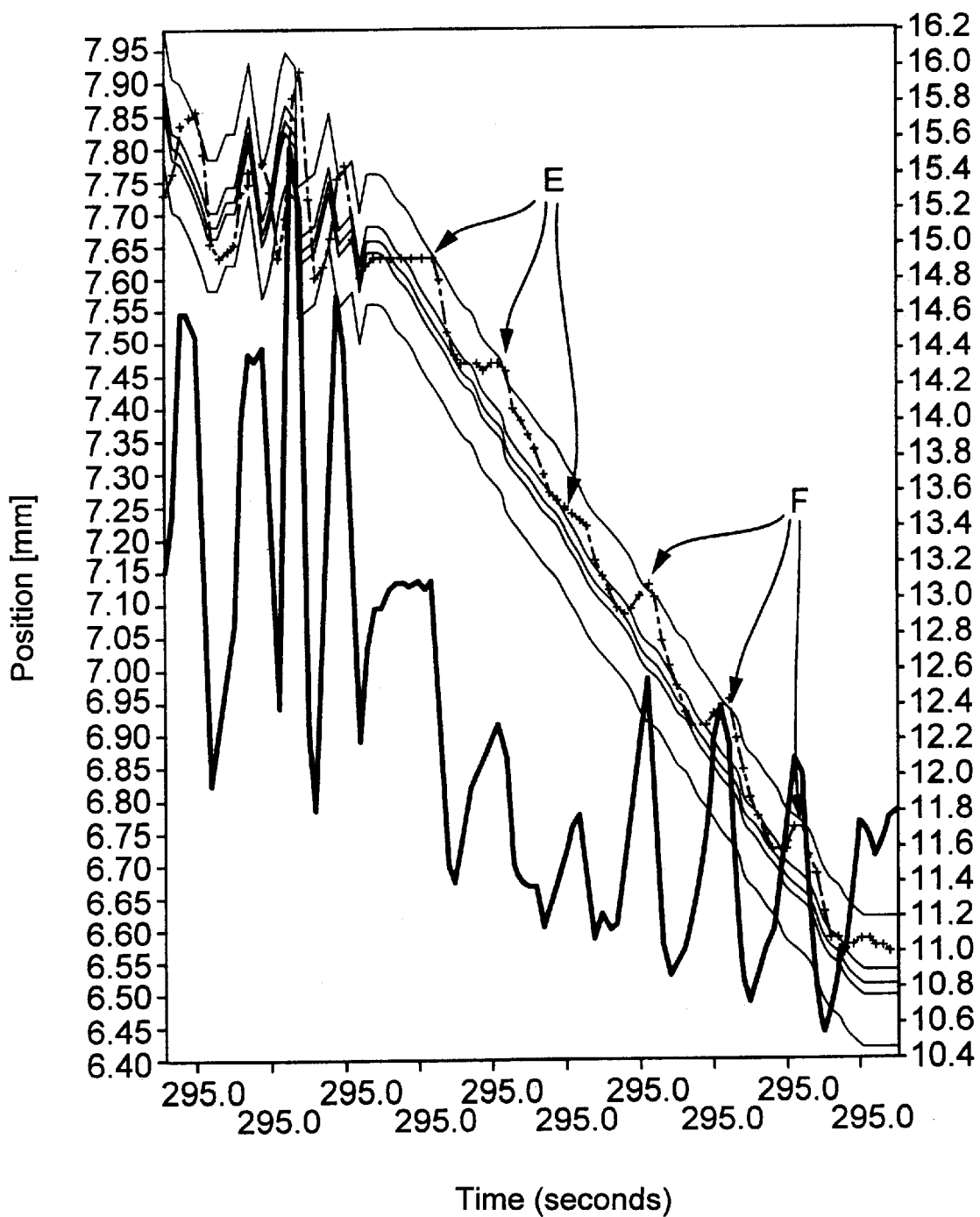
FIG. 4 represents a further graph to illustrate an after-regulation in contrast to an initial process of setting the clutch actuator to a target position.

If $K_{target}$ as a function of time runs along an only slightly rising or falling ramp, $K_{actual}$ will normally change in steps because of the switch-off hysteresis of the position-regulating servo. The regulating loop turns off when the deviation ($K_{target}-K_{actual}$) enters the switch-off hysteresis, i.e., the inner of two bands, and turns on again when the deviation runs outside the switch-on hysteresis, which is the outer of the two bands. This case (shown at "E" in FIG. 4) should not be attributed to after-regulation, because it represents a normal regulating process.

It should be noted that in the latter case, the slope of the curve representing $K_{actual}$ is either zero or negative. Thus, a further criterion can be set for determining the presence of after-regulation, namely that after-regulation is present in a situation where $K_{target}$ decreases only if $K_{actual}$ crosses the switch-on hysteresis boundary at a rising slope angle that exceeds a given positive value (as shown at the locations "F" in FIG. 4). Conversely, after-regulation is present in a situation where $K_{target}$ increases only if $K_{actual}$ crosses the switch-on hysteresis boundary at a falling slope angle that falls below a given negative value.

When detecting the nature of a regulating situation (decreasing, increasing, or constant $K_{target}$), it can at the same time be determined in which direction the actuator is moving away from the target position, i.e., whether "push-back" or a "run-ahead" situation exists. The magnitude and polarity of the bias current to the actuator is then set in accordance with the results of the detection.

To recapitulate, the inventive method of regulating the position of a clutch actuator is presented herein in a first embodiment where the clutch control device performs the steps of: a) determining the current operating state of the vehicle based on a plurality of operating parameters of the vehicle; b) selecting a set of regulation parameters out of a plurality of available regulation parameter sets; and c) regulating the position of the clutch actuator through a position-control loop, using the selected set of regulation parameters. This has the advantage that the regulation parameters are adapted to an actual operating state of the vehicle, so that the regulation is performed in accordance with the demands of the situation. A second embodiment of the inventive method, designed to optimize a bias current that is supplied to the actuator, has the steps of: a) determining the actual position of the clutch actuator; b) comparing the actual position to a target position of the clutch actuator; c) determining the extent and the direction of an after-regulation occurring in the clutch actuator; and d) updating the level of the bias current to the clutch actuator in accordance with the extent and direction of the after-regulation detected under step c).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of regulating a position of a clutch actuator in a vehicle that is equipped with a clutch control device, wherein the clutch control device performs the steps of:

a) determining a current operating state of the vehicle based on a plurality of operating parameters of the vehicle;

b) selecting a set of regulation parameters out of a plurality of available sets of regulation parameters;

c) regulating the position of the clutch actuator through a position-control loop using the selected set of regulation parameters;

wherein the position-control loop comprises a proportional part, an integrating part, and a differentiating part and each set of regulation parameters comprises a P-coefficient for the proportional part, an I-coefficient for the integrating part, and a D-coefficient for the differentiating part, and wherein each set of regulation parameters further comprises precision criteria, as well as switch-off limits and switch-on limits of the position-control loop.

2. The method of claim 1, wherein the selection of step b) is based on said operating state as determined in step a).

3. The method of claim 1, wherein the clutch control device sets at least one flag bit to identify the selected set of regulation parameters to be used in step c).

4. The method of claim 3, wherein the at least one flag bit comprises one flag bit if there are two available sets of regulation parameters, and wherein the at least one flag bit comprises a required number of more than one flag bit if there are more than two available sets of regulation parameters.

5. The method of claim 1, wherein the precision criteria comprise a fine-precision criterion and a coarse-precision criterion.

6. The method of claim 5, wherein under the fine-precision criterion the switch-off limit is substantially 0.02 mm from a target position of the position control loop and the switch-on limit is substantially 0.10 mm from the target position; and wherein under the coarse-precision criterion the switch-off limit is substantially 0.10 mm from the target position and the switch-on limit is substantially 0.20 mm from the target position.

7. The method of claim 1, wherein the clutch actuator comprises an electric motor, and wherein the clutch control device controls speed and direction of said electric motor in order to thereby actuate a clutch.

8. The method of claim 1, wherein the clutch actuator comprises a position sensor to determine an actual travel position of the clutch actuator.

9. A method of regulating a position of a clutch actuator in a vehicle that is equipped with a clutch and a clutch control device, wherein the clutch control device regulates a position of the clutch actuator by performing the steps of:
   a) determining an actual position of the clutch actuator;
   b) comparing the actual position to a target position of the clutch actuator;
   c) determining a magnitude and direction of an after-regulation occurring in the clutch actuator; and
   d) updating an amount of a bias current supplied to the clutch actuator in accordance with the magnitude and direction of the after-regulation detected under step c).

10. The method of claim 9, wherein the amount of the bias current depends on what position the clutch actuator is in, wherein the amount of the bias current as a function of said actuator position is expressed as a bias-current profile in terms of percentages of a maximum possible actuator current, and wherein the clutch control device uses said bias-current profile in performing the method.

11. The method of claim 10, wherein a default profile for the bias-current profile is stored in a memory device of the vehicle before the vehicle is put into service.

12. The method of claim 11, wherein an operating phase begins every time the vehicle is started and wherein the bias-current profile is updated during the operating phase according to one of the group of concepts consisting of:
   a) making a new calculation, beginning from a starting profile in which all values are zero;
   b) making a new calculation, starting from a default profile;
   c) making a new calculation, starting from a profile of most recently stored values of the bias current;
   d) making a new calculation according to concept c), but assigning different weights to the most recently stored values;
   e) making a new calculation using any combination of the foregoing concepts a) through d).

13. The method of claim 9, wherein the bias-current profile is subdivided into segments and wherein the magnitude of the bias current in each segment correlates to one of a series of equally spaced points of a displacement range of the clutch actuator.

14. The method of claim 13, wherein the equally spaced points are located at intervals of 0.5 millimeters.

15. The method of claim 13, wherein the actuator control device adjusts the bias-current profile at a current point of actuator displacement, based on the magnitude and direction of the after-regulation as determined under step c) of the method.

16. The method of claim 15, wherein the adjustment of the bias-current profile at the current point of actuator displacement is made according to one of three concepts, namely:
   a) changing the bias current by a small fixed percentage of a maximum current;
   b) changing the bias current by an amount commensurate with the amount of after-regulation; and
   c) changing the bias current in steps of variable magnitude.

17. The method of claim 16, wherein the bias current is subject to one of the two constraints consisting of a maximum limit for the bias current and a maximum limit for a difference in amounts of the bias current in adjacent segments of the bias-current profile.

18. The method of claim 9, wherein the bias current is set as a function of one of the following:
   operating parameters of the clutch,
   operating parameters of the clutch actuator, and
   operating states of the vehicle.

19. A method of regulating a position of a clutch actuator in a vehicle that is equipped with a clutch and a clutch control device, said method comprising the steps of:
   a) determining actual position values $K_{actual}$ of the clutch actuator;
   b) determining targeted position values $K_{target}$ of the clutch actuator;
   c) determining whether an initial move to a targeted position or an after-regulation to the targeted position is taking place, based on comparing the actual position values and the targeted position values; and
   d) generating a bias current to the clutch actuator in accordance with the results of steps a) to c).

20. The method of claim 19, wherein magnitude and polarity of the bias current are subject to change when the method runs through a next cycle.

21. The method of claim 19, wherein the clutch actuator has an integrated position sensor to detect the actual position value $K_{actual}$.

22. The method of claim 19, wherein the values $K_{target}$ for the target position determined in step b) of the method are assigned to one of three groups corresponding to three different behaviors of the actuator.

23. The method of claim 22, wherein the groups are defined according to whether successively detected values of $K_{target}$ increase, decrease, or stay constant from one to the next, and wherein an increasing trend indicates that the clutch actuator is being pushed back from the targeted displacement position; a decreasing trend indicates that the clutch actuator is running ahead of the targeted displacement position; and a constant value is compatible with either of the conditions of the actuator being pushed back and running ahead.

24. The method of claim 23, wherein the values $K_{target}$ are assigned to the group of increasing values if they change monotonically in a positive direction.

25. The method of claim 23, wherein the values $K_{target}$ are assigned to the group of decreasing values if they change monotonically in a negative direction.

26. The method of claim 23, wherein the values $K_{target}$ are assigned to the group of constant values if they do not change significantly from one detection cycle to the next.

27. The method of claim 26, wherein a target value $K_{target}$ of the actuator position can be attained within a bandwidth defined by a switch-off hysteresis of a control loop of the clutch control device.

28. The method of claim 24, wherein the values of $K_{target}$ are assigned to the group of increasing values if at least one of the conditions is met that the three most recent values of $K_{target}$ show an increasing tendency;

the three most recent values exceed a threshold value of increase from one to the next; and the average increase from one to the next of the three most recent values exceeds a threshold value for the average.

29. The method of claim 24, wherein the values of $K_{target}$ are assigned to the group of decreasing values if at least one of the conditions is met that the three most recent values of $K_{target}$ show a decreasing tendency;

the three most recent values exceed a threshold value of decrease from one to the next; and the average decrease from one to the next of the three most recent values exceeds a threshold value for the average.

30. The method of claim 28 wherein, if the increase of consecutive values of $K_{target}$ exceeds a predetermined threshold, the clutch control device determines that the clutch actuator is not in a state of after-regulation.

31. The method of claim 28 wherein, if the decrease of consecutive values of $K_{target}$ falls below a threshold value, the clutch control device determines that the clutch actuator is not in a state of after-regulation.

* * * * *